United States Patent
Mishra et al.

(10) Patent No.: US 9,129,072 B2
(45) Date of Patent: Sep. 8, 2015

(54) VIRTUAL GPIO

(71) Applicant: QUALCOMM Incorporated, San Diego, CA (US)

(72) Inventors: Lalan Mishra, San Diego, CA (US); Mohit Prasad, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 20 days.

(21) Appl. No.: 13/750,839

(22) Filed: Jan. 25, 2013

(65) Prior Publication Data

US 2014/0108679 A1  Apr. 17, 2014

Related U.S. Application Data

(60) Provisional application No. 61/714,118, filed on Oct. 15, 2012.

(51) Int. Cl.
| | |
|---|---|
| G06F 3/00 | (2006.01) |
| G06F 13/00 | (2006.01) |
| G06F 13/42 | (2006.01) |
| G06F 13/14 | (2006.01) |
| G06F 13/40 | (2006.01) |
| G06F 1/04 | (2006.01) |
| G06F 9/45 | (2006.01) |

(52) U.S. Cl.
CPC .......... *G06F 13/4273* (2013.01); *Y02B 60/1228* (2013.01); *Y02B 60/1235* (2013.01)

(58) Field of Classification Search
CPC ....... G06F 15/78; G06F 13/36; G06F 13/423; G06F 21/10; H04L 49/254; H04L 49/102; H04L 49/109; H04L 49/30; H04L 49/3018; H04L 65/1059; H04L 12/437; H04L 12/4625; H04L 12/2602; H04L 29/06; H04L 41/0681; H04L 41/00
USPC ................... 710/30, 305, 307, 316; 713/600; 716/103; 455/456.1
See application file for complete search history.

(56) References Cited

U.S. PATENT DOCUMENTS

| | | | | |
|---|---|---|---|---|
| 6,020,760 | A * | 2/2000 | Sample et al. | 326/41 |
| 7,114,093 | B2 * | 9/2006 | Tardieux et al. | 713/600 |
| 7,131,077 | B1 * | 10/2006 | James-Roxby et al. | 716/103 |
| 7,484,027 | B1 * | 1/2009 | Dahlin | 710/305 |
| 8,406,633 | B1 * | 3/2013 | Johnston et al. | 398/154 |
| 2001/0050921 | A1 | 12/2001 | Barker et al. | |
| 2004/0127207 | A1 * | 7/2004 | Stufflet et al. | 455/418 |
| 2009/0037621 | A1 | 2/2009 | Boomer et al. | |

(Continued)

FOREIGN PATENT DOCUMENTS

| | | |
|---|---|---|
| EP | 2309395 A1 | 4/2011 |
| EP | 2330514 A1 | 6/2011 |
| WO | WO-9854664 A1 | 12/1998 |

OTHER PUBLICATIONS

International Search Report and Written Opinion—PCT/US2013/065017—ISA/EPO—Jan. 23, 2014.

*Primary Examiner* — Farley Abad
*Assistant Examiner* — Henry Yu
(74) *Attorney, Agent, or Firm* — Paul Holdaway; Raphael Freiwirth (57) ABSTRACT

A finite state machine is provided that both serializes virtual GPIO signals and deserializes virtual GPIO signals responsive to cycles of an external clock. The finite state machine frames the serialized virtual GPIO signals into frames each demarcated by a start bit and an end bit.

20 Claims, 5 Drawing Sheets

(56) References Cited

U.S. PATENT DOCUMENTS

| | | |
|---|---|---|
| 2009/0054075 A1* | 2/2009 | Boejer et al. ............ 455/456.1 |
| 2009/0276721 A1 | 11/2009 | Brockbank |
| 2011/0225339 A1 | 9/2011 | Chen |
| 2012/0072628 A1 | 3/2012 | Crockett et al. |
| 2012/0233374 A1 | 9/2012 | Whitefield et al. |
| 2013/0080677 A1* | 3/2013 | Simmons ................. 710/316 |
| 2013/0111099 A1* | 5/2013 | Nie et al. ................. 710/307 |

* cited by examiner

VIRTUAL GPIO

RELATED APPLICATION

This application claims the benefit of U.S. Provisional Application No. 61/714,118, filed Oct. 15, 2012, the contents of which are hereby incorporated by reference in their entirety.

TECHNICAL FIELD

This application relates to general purpose input/output (GPIO), and more particularly to an integrated circuit configured to use a pair of pins as virtual GPIO pins.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions are then violated.

Accordingly, there is a need in the art for a GPIO architecture that can accommodate numerous input/output signals without requiring an excessive number of pins.

SUMMARY

A virtual GPIO architecture is provided for communication between two integrated circuits each having a processor. Each integrated circuit also includes a GPIO interface for communicating with the remote processor using a set of signals. This set of signals comprises a set of GPIO signals and a set of virtual GPIO signals. Each integrated circuit thus includes a set of GPIO pins corresponding to the set of GPIO signals.

In contrast to the set of GPIO signals, the set of virtual GPIO signals are not transmitted over GPIO pins. Instead, each integrated circuit transmits and receives the set of virtual GPIO signals using a dedicated transmit pin and a dedicated receive pin. In that regard, the set of virtual GPIO signals comprises a transmit set and a receive set. A finite state machine (FSM) in each integrated circuit is configured to serially transmit the transmit set to the remote processor through the dedicated transmit pin. The finite state machine is further configured to serially receive the receive set of virtual GPIO signals from the remote processor over the dedicated receive pin.

The processor provides a first set of signals to the GPIO interface. From the GPIO interface, a portion of the first set of signals are transmitted to the remote processor as a first set of GPIO signals over a first set of corresponding GPIO pins. A remaining portion of the first set of signals from the processor is provided by the GPIO interface in parallel to the FSM. The FSM can then serially transmit the remaining portion as the transmit set of virtual GPIO signals over the dedicated transmit pin.

The GPIO interface also receives a second set of GPIO signals from the remote processor over a second set of corresponding GPIO pins. In addition, the FSM serially receives the receive set of virtual GPIO signals from the remote processor and provides the receive set in parallel to the GPIO interface. The GPIO interface can then provide a second set of signals that comprises the second set of GPIO signals from the remote processor and the receive set of virtual GPIO signals to the processor.

In this fashion, the processor is "agnostic" as to whether the first set of signals it provides to the GPIO interface includes any virtual GPIO signals. Similarly, it makes no functional difference to the processor whether the second set of signals it receives from the GPIO interface includes any virtual GPIO signals. The processor thus needs no configuration or re-programming with regard to its integration with the virtual GPIO architecture disclosed herein. Moreover, the finite state machine is independent of the processor in that it is not software driven. The virtual GPIO architecture can thus function independently while the processor is in a sleep mode or is otherwise inactive, which saves power.

The FSM in one processor transits the transmit set of virtual GPIO signals in a frame demarcated by a start bit and an end bit. The FSM in a remote processor thus receives the transmitted frame as its receive set of virtual GPIO signals. By monitoring whether it receives a complete frame including both the start bit and the end bit, an FSM for one processor can detect whether the remote processor has failed.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A virtual general purpose input/output (GPIO) architecture is provided that enables a system to use a pair of pins as if they constituted a larger plurality of GPIO pins. This architecture is deemed as virtual in that, to the system-level applications creating the virtual GPIO signals, it is as if those virtual GPIO signals were being accommodated for input/output on conventional GPIO pins. In other words, a system on chip (SoC) or processor having the virtual GPIO architecture disclosed herein experiences no functional difference between GPIO signals and virtual GPIO signals. However, only two pins are used to transmit and receive the virtual GPIO signals that would otherwise each need their own dedicated pair of GPIO pins (if the GPIO signal is symmetric).

The virtual GPIO architecture disclosed herein will be discussed with regard to accommodating IPC between an applications processor and a modem processor in a mobile telephone or other communication device. However, it will be appreciated that the virtual GPIO circuits and techniques disclosed herein are widely applicable to system on chip (SoC) or application specific integrated circuits (ASICs) requiring GPIO capabilities.

The disclosed virtual GPIO architecture makes the health of the transmitting node transparent to the receiving node. This is an important advantage, particularly during the debugging stage for software implementation as it indicates to the receiving processor the time that a transmitting processor became inoperative.

To enable such a robust virtual GPIO capability, each integrated circuit includes a dedicated transmit pin coupled to a transmit line on the circuit board and a dedicated receive pin coupled to a receive line of the circuit board. In that regard, the virtual GPIO signals may be divided into a transmit set for transmission over the transmit line and a receive set for reception on the receive line. If the signaling is symmetric, the number of signals in the transmit set for each processor is the same. However, the virtual GPIO architecture disclosed herein can accommodate asymmetric signaling in which the transmit set of virtual GPIO signals for one processor is not the same size as the transmit set for a remote processor.

Figure 1:
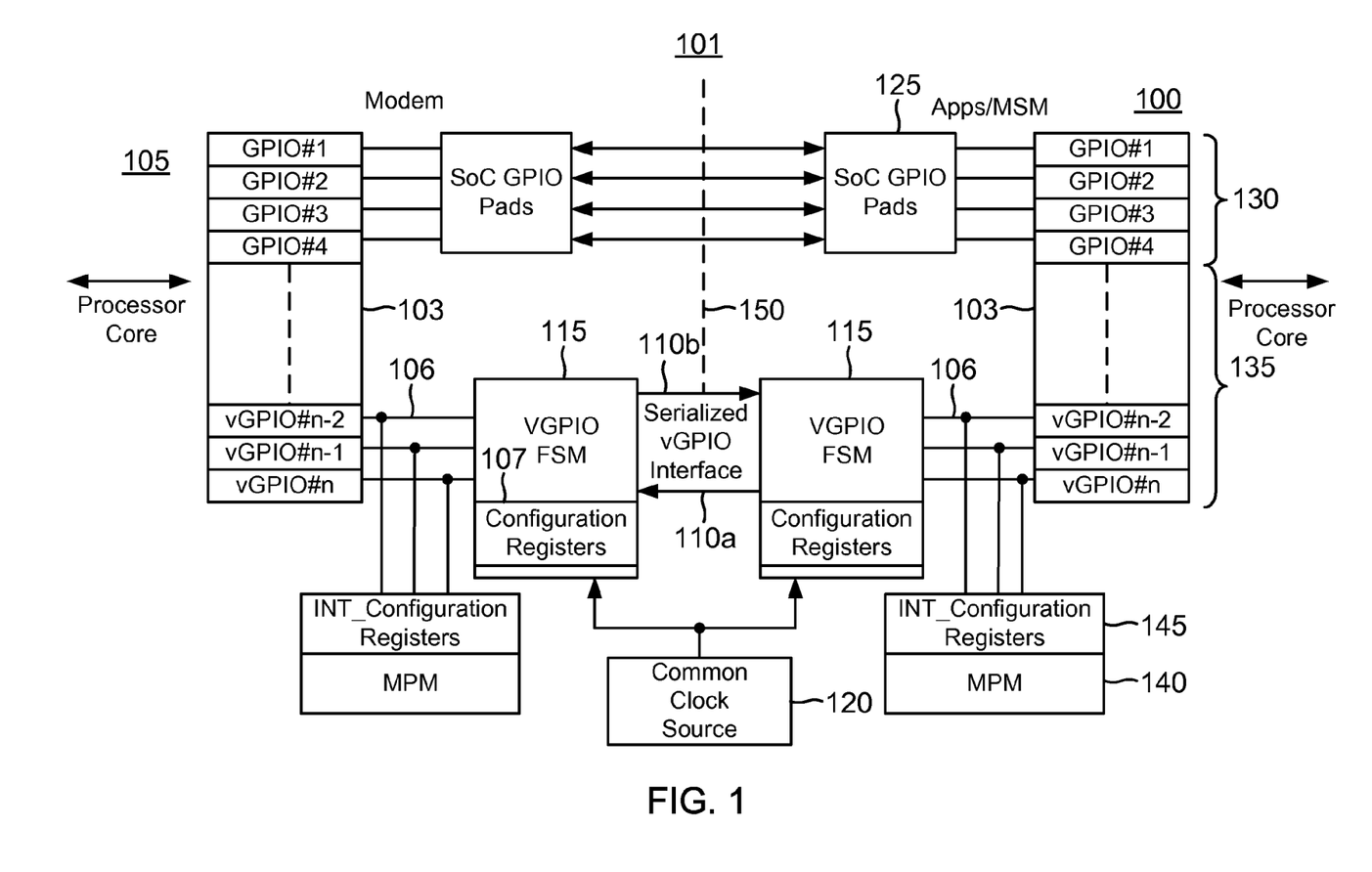
FIG. 1 is block diagram of an example virtual GPIO architecture.

Turning now to the drawings, FIG. 1 illustrates a virtual GPIO architecture 101 with regard to an application processor integrated circuit 100 and a modem processor integrated circuit 105 in corresponding integrated circuits within a mobile telephone or other communication device. Since each integrated circuit couples to a dedicated transmit line and a dedicated receive line, a transmit line 110a for application processor 100 is thus the receive line for modem processor 105. Similarly, a transmit line 110b for modem processor 105 is the receive line for application processor integrated circuit 100. These lines or leads are carried on a circuit board (indicated by dashed line 150) or other physical interconnect between applications processor integrated circuit 100 and modem processor integrated circuit 105. Each integrated circuit includes a dedicated transmit pin to couple to the corresponding transmit line (e.g., line 110b for modem processor integrated circuit 105). Similarly, each processor includes a dedicated receive pin to couple to the corresponding receive line (e.g., line 110a for modem processor 105). A finite state machine (FSM) 115 in each integrated circuit controls the transmission and reception using these dedicated lines and pins with regard to an external clock 120 from an external clock source such as a 32 KHz sleep clock.

As known in the GPIO arts, each processor includes a GPIO interface 103 with which it interfaces with GPIO pins. Advantageously, that GPIO interface may be unchanged in virtual GPIO architecture 101. In other words, each processor receives and transmits signals through its GPIO interface 103 in a conventional manner such that virtual GPIO architecture 101 is transparent to application processor integrated circuit 100 and modem processor integrated circuit 105. A certain portion of the signals processed through each GPIO interface 103 may be transmitted and received on conventional GPIO pins 125 as GPIO signals 130. But a remaining portion of the signals processed through GPIO interface 103 are not transmitted or received through conventional GPIO pins 125. Instead, this remaining portion comprises a plurality of virtual GPIO signals 135 that is transmitted and received through a FSM 115 using a dedicated transmit pin and a dedicated receive pin.

This remaining portion of the signals processed through GPIO interface 103 is designated as virtual GPIO signals 135 because they do not each have their own dedicated pins as is the case for conventional GPIO signals 130. This is quite advantageous in that each processor core requires no retooling of its GPIO interface 103 yet virtual GPIO architecture 101 achieves a significant reduction of pins as compared to a conventional GPIO embodiment in which virtual GPIO signals 135 would each require their own pin.

Figure 2A:
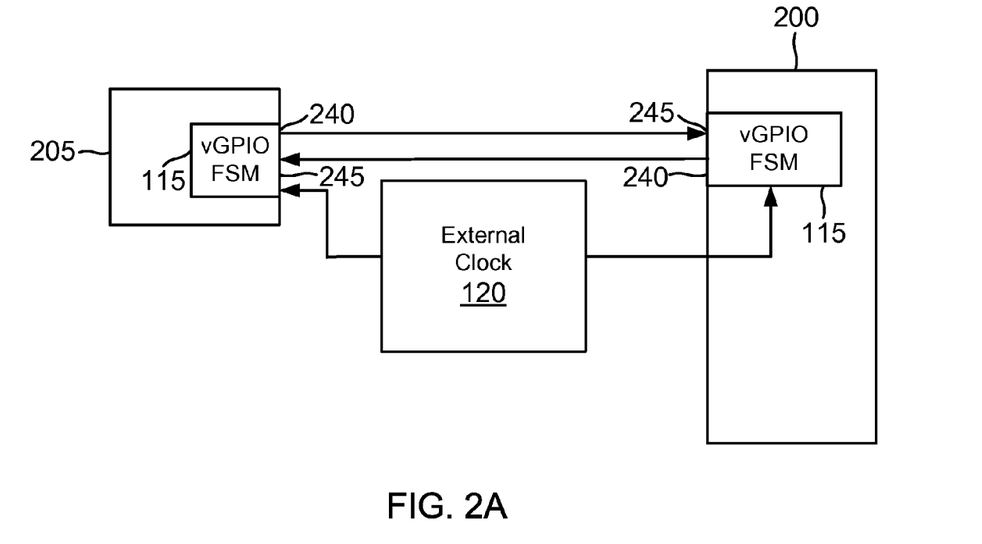
FIG. 2A is a high-level block diagram for a virtual GPIO architecture in which a processor communicates with a single remote processor.
Figure 2B:
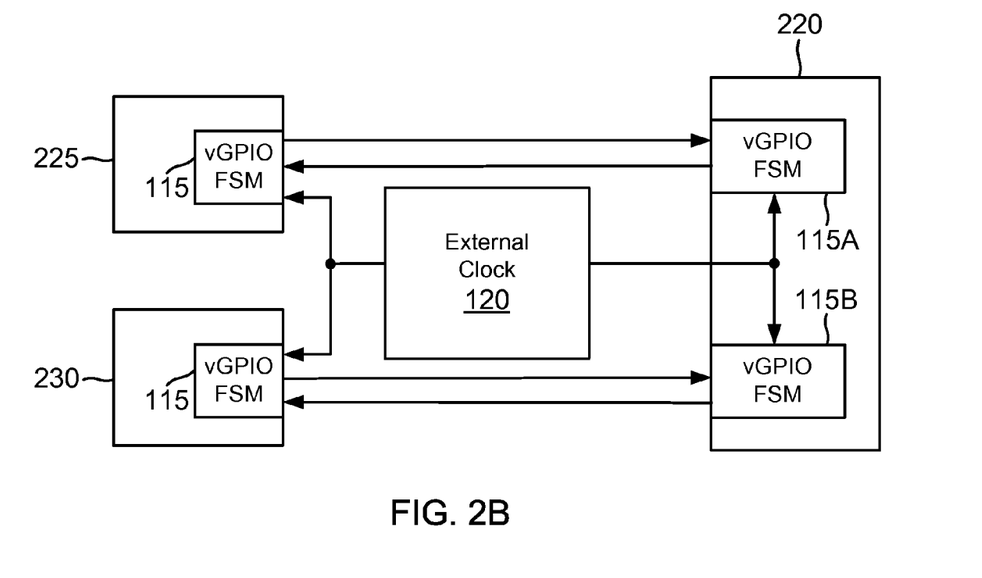
FIG. 2B is a high-level diagram for a virtual GPIO architecture in which a processor communicates with two remote processors.

An integrated circuit may include just one FSM 115 or may include a plurality of these elements for interfacing with multiple external systems. FIG. 2A illustrates a virtual GPIO architecture in which an integrated circuit 200 includes a single FSM 115 for communicating with a remote processor in an integrated circuit 205, which includes its own FSM 115. In contrast, an integrated circuit 220 shown in FIG. 2B includes an FSM 115A and an FSM 115B for communicating with remote processors in integrated circuits 225 and 230, respectively. In that regard, a system on a chip (SoC) such as the processors discussed herein may be configured with as many FSMs as is necessary to accommodate virtual GPIO signaling with other SoCs. Regardless of the number of FSMs a processor may have, each FSM communicates using its own dedicated transmit pin 240 and a receive pin 245 as indicated in FIG. 2A.

Referring again to FIG. 1, because virtual GPIO signals 135 are accommodated using a finite state machine such as FSM 115, the processor cores may be asleep or other type of dormant state yet be able to receive virtual GPIO signals 135. In this fashion, virtual GPIO architecture 101 not only advantageously economizes the number of pins for each GPIO interface 103 but is also low power.

As used herein, "pin" is a generic term to cover the structure such as a pad or an actual pin that an integrated circuit uses to couple to leads on circuit board or other physical interconnect (e.g., package interconnect or through-hole via interconnect). For example, if each integrated circuit has sixteen GPIO pins 125, then these pins could be configured to accommodate eight symmetric GPIO signals 130 (for illustration clarity, only four conventional GPIO signals #1 through #4 are shown in FIG. 1) or sixteen asymmetric GPIO signals 130. In addition, each integrated circuit can accommodate the input/output interfacing of a plurality of n virtual GPIO signals 135 using lines 110a and 110b, wherein n is an arbitrary plural integer. With regard to each processor core, there is no difference between GPIO signals 130 and virtual GPIO signals 135: they are both simply signals that are transmitted and received as necessary through GPIO interface 103. However, since virtual GPIO signals 135 do not have dedicated pins in contrast to conventional GPIO signals 130, virtual GPIO signals 135 are serialized in FSMs 115 for transmission on lines 110a and 110b. Upon reception, each FSM 115 deserializes the received serialized virtual GPIO signals. Thus, each FSM 115 functions as a serializer/deserialize with regard to virtual GPIO signals 135.

A processor may need to receive an interrupt signal in response to changes in selected ones of the GPIO signals.

With respect to virtual GPIO signals 135, a modem power manager (MPM) 140 monitors the selected GPIO signals as programmed through interrupt configuration registers 145. Each virtual GPIO signal 135 has a corresponding interrupt configuration register 145. Should a virtual GPIO signal 135 be required to generate an interrupt in response to that signal changing state, the corresponding configuration register 145 would be programmed accordingly. Similarly, should a virtual GPIO signal 135 be one that does not generate an interrupt regardless of whether that signal has changed state, the corresponding interrupt configuration register would also be programmed accordingly. MPM 140 may also comprise a finite state machine. Thus, just like FSM 115, MPM 140 is low power and is active regardless of whether its processor is in a sleep mode or some other dormant state.

Virtual GPIO signals 135 may be subdivided into a transmit set and a receive set. In a symmetric system, each set would have the same number. However, it will be appreciated that virtual GPIO architecture 101 is advantageous in that it can readily accommodate an asymmetric signaling embodiment in which the transmit and receive sets of virtual GPIO signals 135 have different sizes. Regardless of whether virtual GPIO architecture 101 is symmetric or asymmetric, each FSM 115 receives the transmit set of virtual GPIO signals 135 in parallel from GPIO interface 103 in the sense that each signal in the transmit set of virtual GPIO signals 135 is carried on its own lead 106 between GPIO interface 103 and FSM 115. In contrast, the resulting transmission of this transmit set by FSM 115 takes place over a single transmit pin 240 as discussed with regard to FIG. 2A. This transmit set of virtual GPIO signals then becomes the receive set for the remote processor. The remote processor's FSM then deserializes the receive set so that it may be presented in parallel to GPIO interface 103.

Each FSM 115 includes configuration registers 107 that store the previous state for the transmit set of virtual GPIO signals 135. In this fashion, each FSM 115 can monitor the present state of the transmit set as received from GPIO interface 103 and only trigger a serial transmission of the transmit set if the present state has changed with regard to the previous state. In other words, FSM 115 will trigger a serial transmission of the transmit set only if one or more of the signals within the transmit set has changed state as detected through the storage of the previous state in configuration registers 107.

Figure 3:
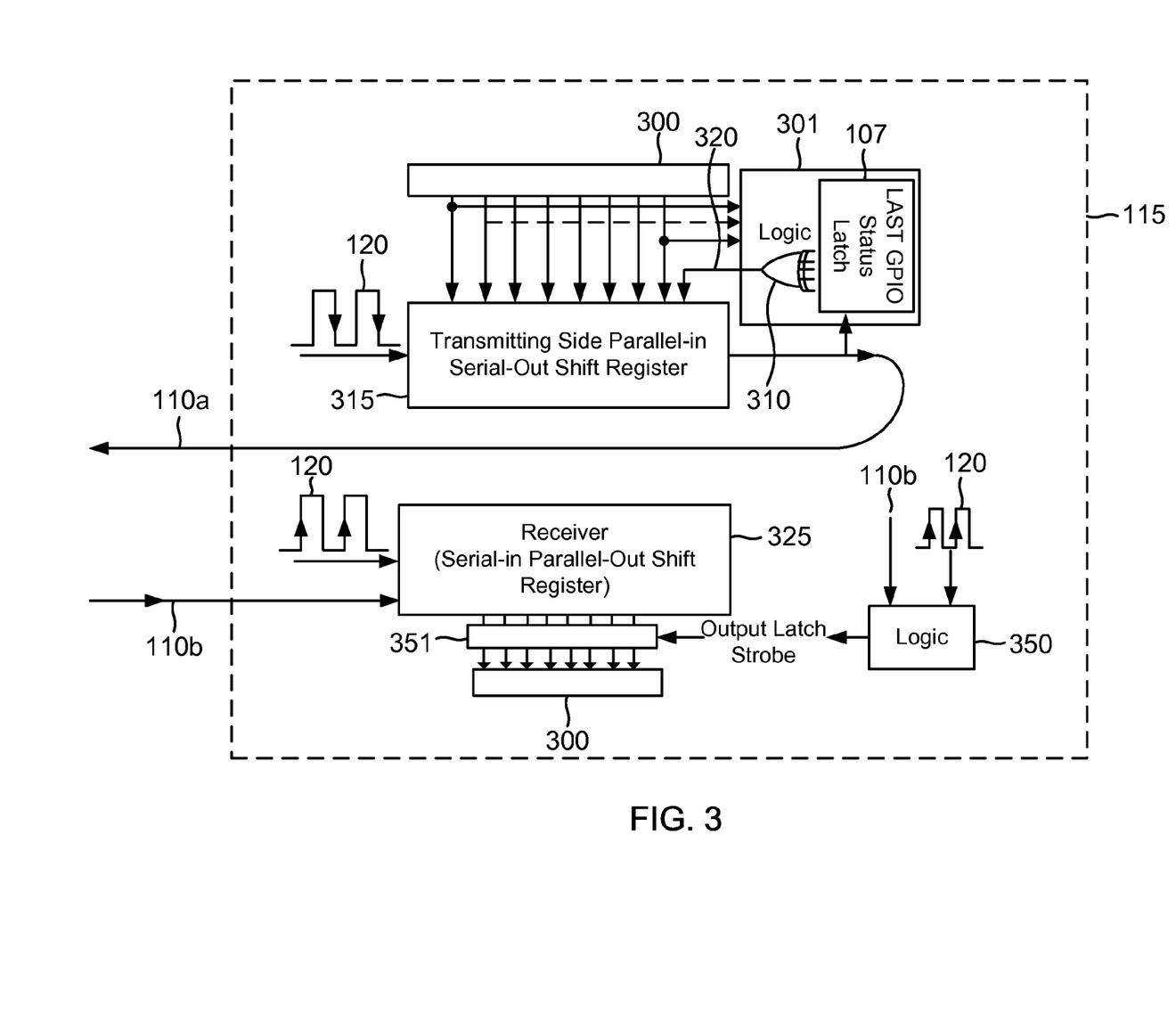
FIG. 3 is a block diagram for a virtual GPIO finite state machine.

As discussed above, each FSM 115 acts as a serializer/deserializer to serialize the transmit set of virtual GPIO signals 135 and to deserialize the receive set of virtual GPIO signals 135. FIG. 3 is a block diagram of an FSM 115 to better illustrate these operations. FSM 115 exchanges virtual GPIO signals 135 with the processor core through a multiplexing module 300 via GPIO interface 103 (FIG. 1). In one embodiment, FSM 115 includes a logic circuit 301 that will authorize the transmission of the transmit set of virtual GPIO signals 135 over transmit line 110a if there has been a change in the transmit set. Logic circuit 301 thus compares the current state for the transmit set of virtual GPIO signals 135 to the previous state for this set of transmit signals as stored in configuration registers 107. For example, logic circuit 301 may include an XOR gate 310 to perform this comparison. Multiplexing module 300 loads the transmit set in parallel into a parallel-in-serial-out (PISO) shift register 315. If an enable signal 320 from XOR gate 310 goes high (indicating a change between the current state and the previous state for the transmit set), PISO shift register 315 is enabled to serially shift out its contents onto transmit line 110a responsive to cycles of external clock 120.

FSM 115 also deserializes a receive set of virtual GPIO signals in an analogous fashion using a serial-in-parallel-out (SIPO) shift register 325. The receive set of virtual GPIO signals 135 is generated by the remote processor and transmitted by the remote processor onto receive line 110b. This receive set of virtual GPIO signals 135 is successively shifted into SIPO shift register 325 responsive to cycles of external clock 120. FSM 115 is configured to transmit the transmit set and to receive the receive set of virtual GPIO signals 135 in frames having a separate start bit and an end bit as discussed further herein.

The frames have a predefined size. In one embodiment, the frame size may be fixed to be a certain number of bits long. If the transmit set of virtual GPIO signals is less than this fixed size, the unused bits within each frame may be don't care values. Alternatively, each FSM 115 may be configured to alter the size of the transmitted frames depending upon the number of bits needed for a given application.

To detect the receipt of a complete frame for the receive set of virtual GPIO signals 135, FSM 115 may include a logic circuit 350 that counts the necessary number of cycles for external clock 120 after a receipt of the start bit for the frame. For example, suppose the receive set comprises ten virtual GPIO signals that are received responsive to ten cycles of external clock 120. After detection of the start bit and waiting another ten cycles of external clock 120, logic circuit 350 would then expect receipt of the end bit. Should the end bit be detected accordingly, logic circuit 350 may then strobe an output latch 351 to receive in parallel the receive set of virtual GPIO signals that had been shifted into SIPO shift register 325 as a complete frame. The latched receive set of virtual GPIO signals may then be presented to GPIO interface 103 through multiplexing module 300.

Referring again to PISO shift register 315, it will be appreciated that this register is configured to frame the transmit set of virtual GPIO signals with the start and end bits. The transmit set of virtual GPIO signals is thus transmitted in a frame demarcated by the start and end bits. Since the transmit set for a processor becomes the receive set for the remote processor, the receive set is also framed accordingly. This framing is advantageous in that each processor can then monitor the health of the remote processor without needing any additional dedicated pins. For example, each FSM 115 may be configured to weakly pull its dedicated transmit pin 240 (and hence weakly pull transmit line 110a) to a supply voltage during a default state (no change in the current state versus the previous state for the transmit set of virtual GPIO signals). The start bit would be a logical zero for such an embodiment such that FSM 115 grounds transmit line 110a for transmission of the start bit. In this fashion, each FSM 115 may readily detect receipt of the start bit by detecting that receive line 110b has been pulled towards ground. In one embodiment, the start and stop bits are logical complements of each other.

There is the possibility that a processor has failed such that it inappropriately pulls its transmit line 110a to ground. The remote processor would thus detect this as a start bit and logic circuit 350 would begin counting toward the end of the frame accordingly. But the end bit is a logical one in this embodiment such that each FSM 115 charges transmit line 110a to the supply voltage to signal the end of a frame transmission. If a processor has failed such that the remote FSM has detected what is deemed to be a start bit, logic circuit 350 will not detect the end bit and will notify its processor of the failure of the remote processor accordingly.

Figure 4:
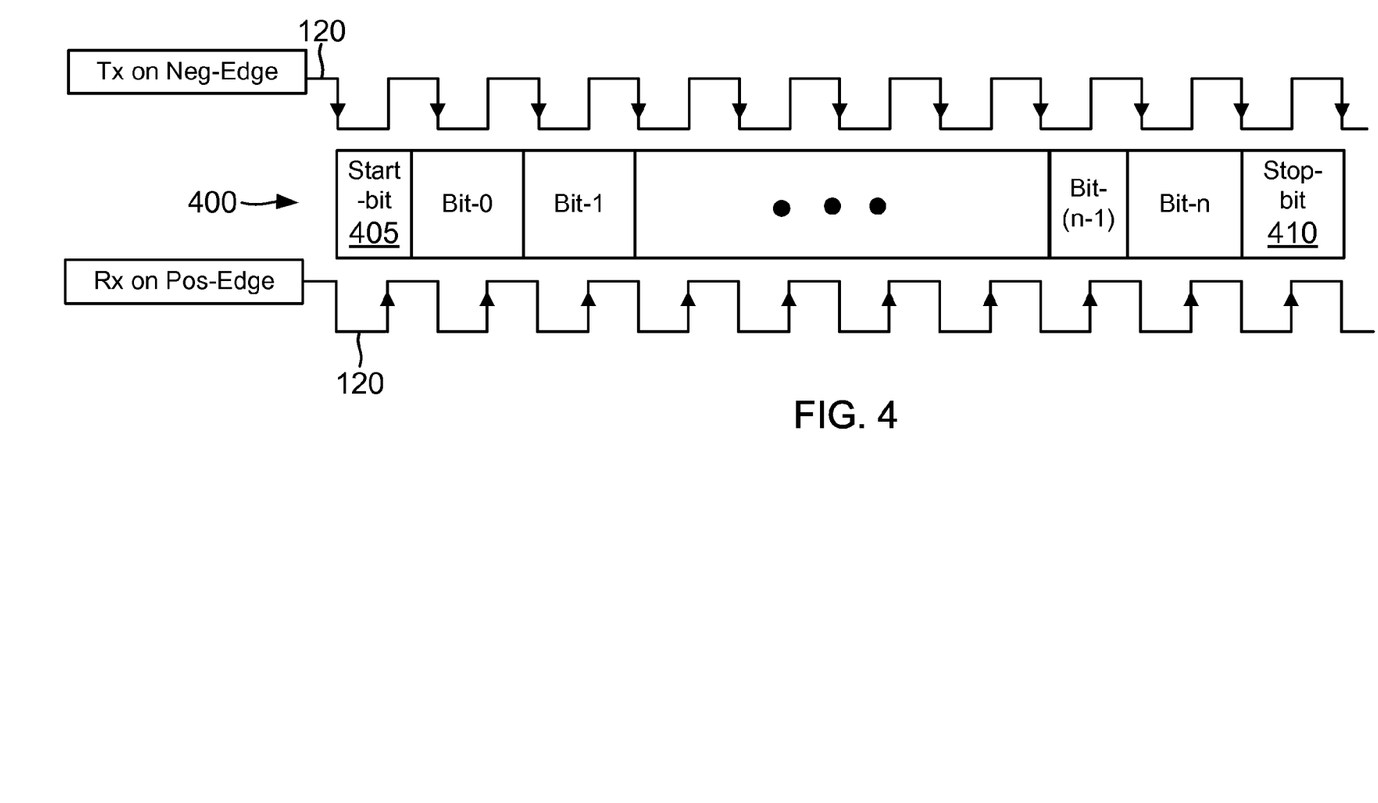
FIG. 4 illustrates the timing relationship between transmission and reception of a virtual GPIO frame.

FIG. 4 shows an exemplary timing with regard to external clock 120 for the transmission and reception of a virtual GPIO frame 400. To allow sufficient setup time for reception, transmission should take place with regard to a first clock edge and reception with regard to a remaining clock edge. For example, the bits in PISO shift register 315 may be shifted out for transmission on transmit line 110a responsive to the falling edges or negative edges for external clock 120. Conversely, received bits on receive line 110b may be shifted into SIPO shift register 325 responsive to the rising edges or positive edges of clock 120.

For one processor to detect an inactive state in the remote processor, each FSM 115 may be configured to weakly pull its transmit line high in a default state (in which there are no frames to transmit). The start and stop bits have opposite logical states. A start bit 405 may thus be a zero such that transmit line 110a is pulled low for its transmission whereas a stop bit 410 may be a binary one value such that the transmit line 110a is pulled high for its transmission. Referring again to FIG. 3, logic circuit 350 is configured to monitor receive line 110b with respect to the rising edges on external clock 120. A default logic state of a no-frame transmission is indicated by receive line 110b simply remaining high because of its weak pull-up as discussed earlier. Should logic circuit 350 detect at one of rising edges for external clock 120 that receive line 110b has been pulled low (indicating the zero value of start bit 405), logic circuit 350 waits for a sufficient number of clock cycles according to the predefined size of virtual GPIO frame 400 to then detect the logic high value of stop bit 410. Receipt of stop bit 410 indicates to logic circuit 350 that a complete virtual GPIO frame 400 has been fully shifted into SIPO shift register 325. At that point, logic circuit 350 strobes SIPO shift register 325 so that the received virtual GPIO frame 400 is provided in parallel to multiplexing module 300 through output latch 351. The receive set of virtual GPIO signals may then be provided to the processor core accordingly through GPIO interface 103.

A relatively slow external clock 120 such as a 32 KHz sleep clock is ample for the signaling requirements of IPC. For example, suppose that the minimum setup and hold requirements for the transmission of the virtual GPIO signals is two nanoseconds each and that the maximum expected lead or lag for receipt of external clock 120 at a virtual GPIO FSM is six nanoseconds. It can be readily shown that the resulting maximum frequency for external clock 120 would be 62 MHz. A 32 KHz frequency such as from a sleep clock would thus provide very large margins of safety for such an embodiment.

Figure 5:
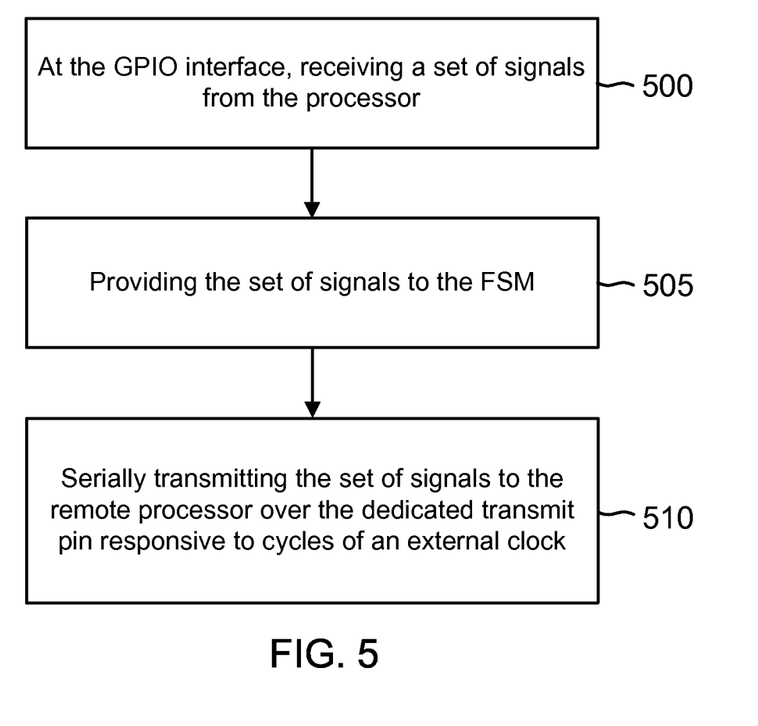
FIG. 5 is a flowchart for a method practiced by the GPIO architecture of FIG. 1.

A method of operation for architecture 101 is summarized in the flowchart of FIG. 5. The method begins with the GPIO interface receiving a set of signals from its processor in a step 500. From the GPIO interface, the set of signals are then provided to the FSM in a step 505. The FSM serially transmits the set of signals over the dedicated transmit pin responsive to cycles of the external clock in a step 510.

Consider the advantages of the disclosed virtual GPIO architecture: only two pins and a common clock source are necessary yet any number of virtual GPIO signals can be serialized and deserialized through the finite state machines. The only limit is the timing requirements for the virtual GPIO signals with respect to external clock 120 and any expected amount of clock lag or lead. Moreover, no other pins are necessary to make the health of one processor transparent to the opposing processor.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising:
a processor;
a plurality of GPIO pins;
a GPIO interface configured to receive a first set of GPIO signals from the processor and a second set of GPIO signals from the processor, wherein the GPIO interface is further configured to transmit the second set of GPIO signals to a remote processor over corresponding ones of the GPIO pins;
a dedicated transmit pin; and
a finite state machine (FSM) configured to receive the first set of GPIO signals from the GPIO interface and to serially transmit the first set of GPIO signals as a transmit set of virtual GPIO signals to the remote processor over the dedicated transmit pin responsive to cycles of an external clock.

2. The integrated circuit of claim 1, further comprising a dedicated receive pin, the FSM being further configured to serially receive a receive set of virtual GPIO signals from the remote processor over the dedicated receive pin responsive to cycles of the external clock and to provide the receive set of virtual GPIO signals to the GPIO interface.

3. The integrated circuit of claim 1, wherein the processor comprises an application processor.

4. The integrated circuit of claim 1, wherein the processor comprises a modem processor.

5. The integrated circuit of claim 2, wherein the FSM comprises a parallel-in-serial-out (PISO) shift register and a serial-in-parallel-out (SIPO) shift register.

6. The integrated circuit of claim 1, wherein the FSM is further configured to serially transmit the transmit set of virtual GPIO signals in a frame demarcated by a start bit and an end bit.

7. The integrated circuit of claim 2, wherein the FSM is further configured to serially receive the receive set of virtual GPIO signals in a frame demarcated by a start bit and an end bit.

8. The integrated circuit of claim 7, wherein the FSM is further configured to detect a failure of the remote processor by detecting a failure to receive the end bit for the frame.

9. The integrated circuit of claim 2, wherein the FSM is configured to serially transmit the transmit set of virtual GPIO signals responsive to first clock edges for the external clock and to serially receive the receive set of virtual GPIO signals responsive to opposing second clock edges for the external clock.

10. The integrated circuit of claim 9, wherein the first clock edges are rising clock edges and wherein the second clock edges are falling clock edges.

11. The integrated circuit of claim 1, wherein the FSM is further configured to compare a current state to a previous state for the transmit set of virtual GPIO signals, and wherein the FSM is further configured to serially transmit the transmit set when the current state has changed in comparison to the previous state, the FSM being further configured to maintain a default logic state on the dedicated transmit pin when the current state has not changed in comparison to the previous state.

12. The integrated circuit of claim 11, wherein the FSM is further configured to serially transmit the transmit set of virtual GPIO signals in a frame demarcated by a start bit and an end bit, and wherein the start bit has a different logic state than the default logic state.

13. The integrated circuit of claim 12, wherein the end bit comprises the default logic state.

14. A method, comprising:
   at a GPIO interface, receiving a first set of GPIO signals from a processor and receiving a second set of GPIO signals from the processor;
   from the GPIO interface, transmitting the second set of GPIO signals through corresponding GPIO pins to a remote processor;
   from the GPIO interface, providing in parallel the first set of GPIO signals to a finite state machine (FSM); and
   in the FSM, serially transmitting the first set of GPIO signals as a transmit set of virtual GPIO signals to the remote processor over a dedicated transmit pin responsive to cycles of an external clock.

15. The method of claim 14, further comprising:
   at the FSM, serially receiving a receive set of virtual GPIO signals from the remote processor over a dedicated receive pin responsive to cycles of the external clock;
   from the FSM, providing the receive set of virtual GPIO signals in parallel to the GPIO interface; and
   from the GPIO interface, providing the receive set of virtual GPIO signals to the processor as a second set of signals.

16. An integrated circuit, comprising:
   a processor;
   a plurality of GPIO pins;
   a GPIO interface configured to receive a first set of GPIO signals from the processor and to transmit a portion of the first set of GPIO signals as first GPIO signals to a remote processor through corresponding ones of the GPIO pins;
   a dedicated transmit pin; and
   first means for receiving a remaining portion of the first set of GPIO signals from the GPIO interface and for serially transmitting the remaining portion as a transmit set of virtual GPIO signals to the remote processor over the dedicated transmit pin responsive to cycles of an external clock.

17. The integrated circuit of claim 16, further comprising:
   a dedicated receive pin, and
   second means for serially receiving a receive set of virtual GPIO signals from the remote processor over the dedicated receive pin responsive to cycles of the external clock and for presenting the receive set of virtual GPIO signals in parallel to the GPIO interface.

18. The integrated circuit of claim 17, wherein the GPIO interface is further configured to provide a second set of signals to the processor, and wherein the second set comprises the receive set of virtual GPIO signals and a second set of GPIO signals from the remote processor.

19. The integrated circuit of claim 16, wherein the processor comprises an application processor in a mobile telephone.

20. The integrated circuit of claim 16, wherein the processor comprises a modem processor in a mobile telephone.

* * * * *